Oct. 31, 1950 — R. L. TOSTENRUD ET AL — 2,527,974
STALK PULVERIZER
Filed July 15, 1949 — 3 Sheets-Sheet 1

Inventors
Ralph L. Tostenrud
Henry F. Irmiter

By John N. Randolph
Attorney

Inventors
Ralph L. Tostenrud
Henry F. Irmiter

By John N. Randolph

Attorney

Oct. 31, 1950 R. L. TOSTENRUD ET AL 2,527,974
STALK PULVERIZER
Filed July 15, 1949 3 Sheets-Sheet 3

Ralph L. Tostenrud
Henry F. Irmiter
John N. Randolph

Patented Oct. 31, 1950

2,527,974

UNITED STATES PATENT OFFICE 2,527,974

STALK PULVERIZER

Ralph L. Tostenrud and Henry F. Irmiter,
Armstrong, Iowa

Application July 15, 1949, Serial No. 104,918

1 Claim. (Cl. 55—118)

This invention relates to a novel construction of machine which is adapted to be drawn by a draft vehicle such as a farm tractor and which is provided with driven means adapted to be connected to and driven by a power take-off shaft of the tractor for cutting and pulverizing stalks in the field, particularly corn stalks and which is readily capable of pulverizing corn stalks to such an extent that field corn borers which hibernate in the stalks during the fall and winter will be exposed to the weather and to the elements so that the borer worms will be killed.

Another object of the invention is to provide a cutting and pulverizing machine which may also be utilized for breaking up hard and lumpy soil which cannot be accomplished with the use of a conventional harrow or disk and which machine will likewise function efficiently to break up weed patches, sweet clover stalks, cotton stalks and the like so that a field containing such growths may be plowed and cultivated and the shredded stalks plowed under and thereby beneficially utilized to improve the soil.

Another and important object of the invention is to provide a cutting and pulverizing machine which will pass over stones and other obstructions in the field, while in operation, without damage or injury to any of the machine parts and which may be adjusted vertically to vary the depth of its cutting and pulverizing action.

Various other objects and advantages of the invention will hereinafter become more fully apparent from the following description of the drawings, illustrating a presently preferred embodiment thereof, and wherein.

Figure 1:
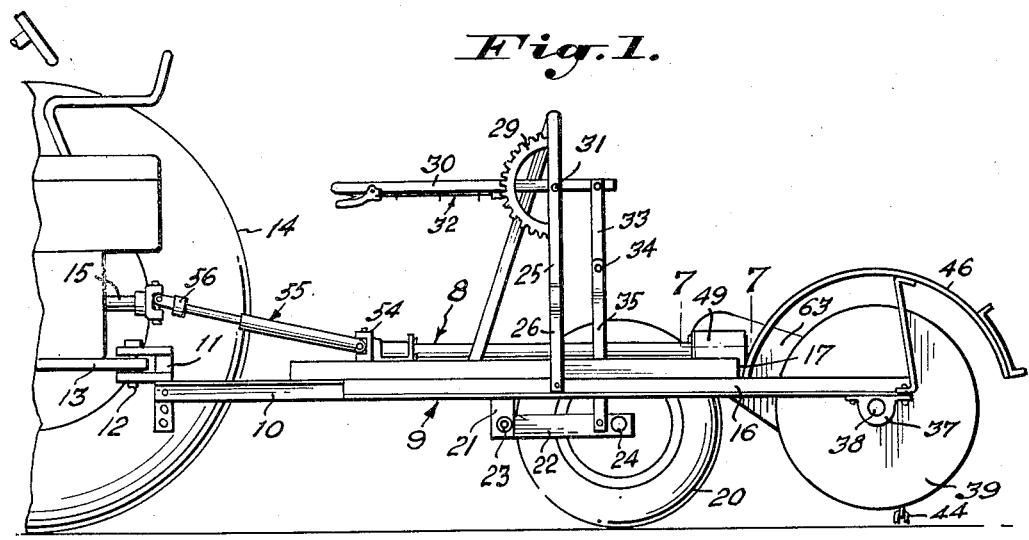
Figure 1 is a side elevational view of the pulverizing and cutting machine shown attached to the rear end of a tractor or similar draft vehicle.

Referring more specifically to the drawings, the pulverizing and cutting machine in its entirety is designated generally 8 and includes a relatively wide open frame 9 having a rigid forwardly extending tongue 10 which is connected at its forward end, for vertical adjustment, to a coupling member 11, which coupling member 11 is connected by a coupling pin 12 to the drawbar 13 of a tractor 14 for horizontal swinging movement relatively to said tractor. Any conventional form of tractor 14 may be utilized for pulling the machine 8 provided that it is equipped with a power take-off shaft, as shown at 15.

The frame 9 is relatively wide and is provided with longitudinally extending side members 16 which are connected at their forward ends and intermediate of their ends by transversely extending frame members or braces 17. The frame 9 also includes longitudinally extending frame members 18 which are secured at their ends to the cross members 17 and one of which is disposed inwardly of and spaced from each of the side frame members 16 to provide an elongated frame opening 19 at each side of the frame 9, near its forward end, for receiving a supporting ground engaging wheel 20. The machine 8 is supported by the two transversely spaced ground engaging wheels 20, each of which is mounted for vertical swinging movement relatively to the frame 9.

The frame members 16 and 18, adjacent the forward ends of the opening 19 are each provided with a depending hanger 21. A lever 22 is pivotally connected at 23 at its forward end to each of the hangers 21. Said levers 22 extend rearwardly from the hangers 21 and the pair of levers 22 adjacent each side of the frame 9 straddle the forward half of the wheel 20 of said frame side. An axle 24 is mounted between the rear end of each pair of levers to provide a journal for the wheel 20 which is mounted thereon.

An upright standard 25 is mounted over each wheel opening 19 and adjacent the forward end thereof and is provided with a bifurcated lower end 26 which is secured to the frame portions 16 and 18 of said opening 19, by fastenings 27. The upper end of each standard 25 is preferably reinforced by a downwardly and forwardly extending brace 28 which is secured by another fastening 27 to the frame 9. A semicircular latch segment 29 is secured at its ends to the upper portion of each standard 25 and extends forwardly therefrom. A lever 30 is pivotally mounted at 31 adjacent its rear end to each standard 25 and centrally with respect to its latch segment 29. The longer, forwardly extending end of each lever 30 terminates in a handle and has a conventional spring projected latch unit 32 carried thereby for normally engaging the latch segment 29 for latching the lever 30 in any one of a plurality of angularly adjusted positions relatively to the standard 25. It will be readily apparent that each lever 30 is independently swingable relatively to its supporting standard 25 and adapted to be independently latched in a plurality of angularly adjusted positions. A link 33 is pivotally connected to each lever 30 adjacent its rear end and depends downwardly therefrom and is pivotally connected at its lower end by a fastening 34 to a depending fork 35 which extends downwardly therefrom into the wheel opening 19 disposed therebeneath. The legs of each fork 35 straddle a portion of the wheel 20 disposed therebeneath and are pivotally connected as seen at 36 adjacent their lower ends to the levers 22 on which said wheel 20 is journaled and swingably mounted, near the axle 24, so that when the forward ends of the levers 30 are swung downwardly the links 33 and forks 35 will be raised for swinging the levers 22 upwardly on their pivots 23 for elevating the wheels 20 relatively to the frame 9, or by lifting the forward ends of the levers 30, the links 33 and forks 35 will be depressed for swinging the levers 22 and wheels 20 downwardly relatively to the frame 9. It will likewise be readily obvious that the levers 30 may be latched in any adjusted positions by their latch units 32 for supporting the wheels 20 at any desired level relatively to the frame. Actually, the movement of the levers 30 will raise and lower the frame 9 relatively to the wheels 20 when said wheels are in engagement with a supporting surface and it will be readily apparent that the two sides of the frame 9 may thereby be independently raised or lowered relatively to one another, if desired.

The side members 16 extend rearwardly to substantially beyond the rear cross brace 17 and are each provided adjacent its rear end with a bearing 37. A shaft 38 is journaled in the bearings 37 and extends transversely across the rear end of the frame 9. A disk 39 is fixed to the shaft 38 inwardly of and adjacent each frame member 16 for rotation therewith. A supporting structure, designated generally 40, extends between the disks 39 and is secured at its ends thereto and has the shaft 38 extending centrally therethrough. The diameter of each disk 39 is greater than the cross sectional width of any part of the support 41 so that the periphery of each disk is spaced a greater distance from the shaft 38 than the distance between the shaft 38 and any part of the support 41. Said supporting structure is substantially square in cross section and is formed of four corresponding side members 41 each having an outturned edge 42 which is disposed against and secured to the flat edge of an adjacent side member 41 by rivets or similar fastenings 43 so that the support 40 is provided with an outwardly projecting flange at each corner thereof, each of which flanges is disposed at a right angle to the two adjacent flanges and parallel to the flange diametrically opposite thereto. The rivets or fastenings 43 are staggeredly arranged and equally spaced from end-to-end of the support structure 40 and each fastening 43 connects an end link of a short chain 44 to the supporting structure. Each chain 44 has a weighted element or hammer 45 pivotally connected to the outer end link thereof and said chains are of sufficient length so that the hammers or impact elements 45 will strike the ground when the chains are revolved and when the frame 9 is disposed at a normal elevation, as will hereinafter be described. The outer end link of each chain 44, when the chain is extended, is disposed a greater distance from the axis of the shaft 38 than the peripheries of the disks 39. The chains 44 of each corner flange of the support 40 are spaced preferably about eight inches apart and as the chains 44 of the different corner flanges are staggeredly arranged, it will be readily apparent that the chains 44 are spaced from end-to-end of the support approximately two inches apart. The support 40 may be of any desired length so as to include any desired number of chains 44 and hammer members 45.

Figure 4:
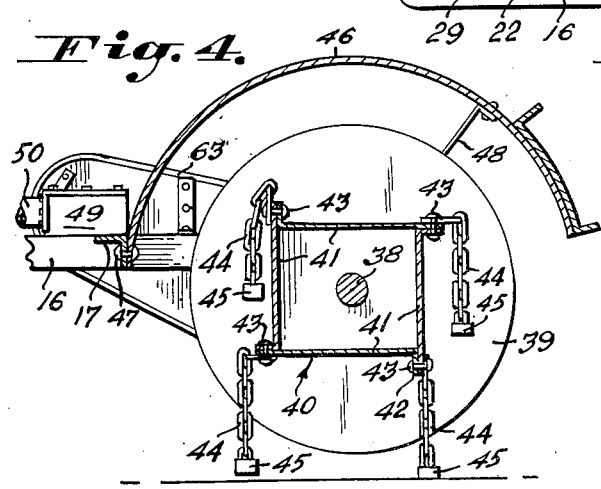
Figure 4 is an enlarged longitudinal sectional view thereof taken substantially along a plane as indicated by the line 4—4 of Figure 3.

A shield or cover member 46 of arcuate cross section extends between the rear ends of the side frame members 16 and is disposed over the shaft 38, the disks 39 and the support 40 and is disposed substantially concentric to said shaft and disks and spaced a sufficient distance therefrom, as illustrated in Figure 4, so that the shield will not be struck by the chains 44 or impact members 45. The forward edge of the shield 46 is preferably secured by fastenings 47 to the rear cross frame member 17 and said shield is preferably braced near its rear end by braces 48 which extend between the shield and the rear end portions of the side frame members 16.

Figure 7:
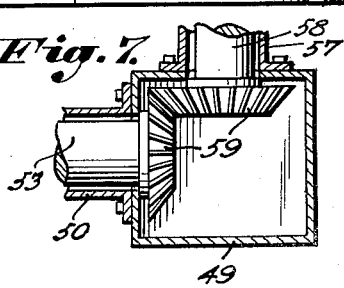
Figure 7 is an enlarged horizontal sectional view taken substantially along a plane as indicated by the line 7—7 of Figure 1.
Figure 5:
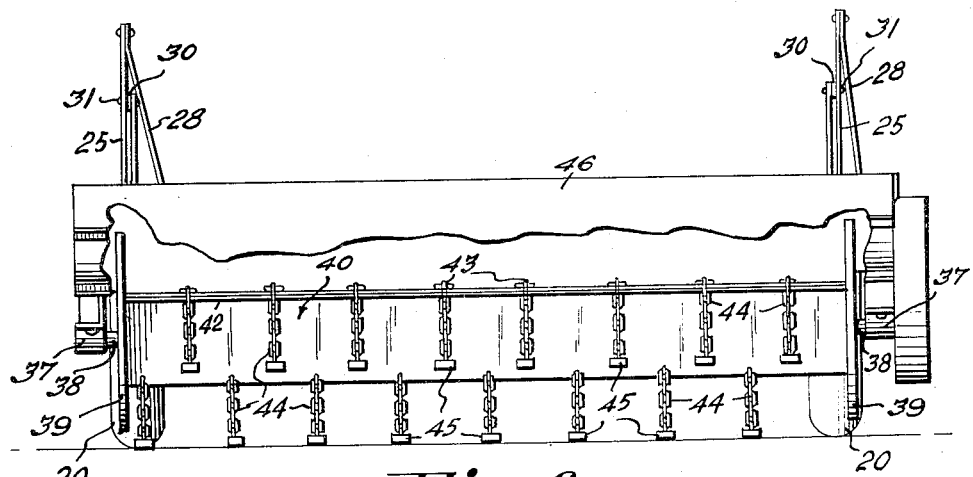
Figure 5 is a rear elevational view of the machine with the protective shield broken away to illustrate details thereof.
Figure 6:
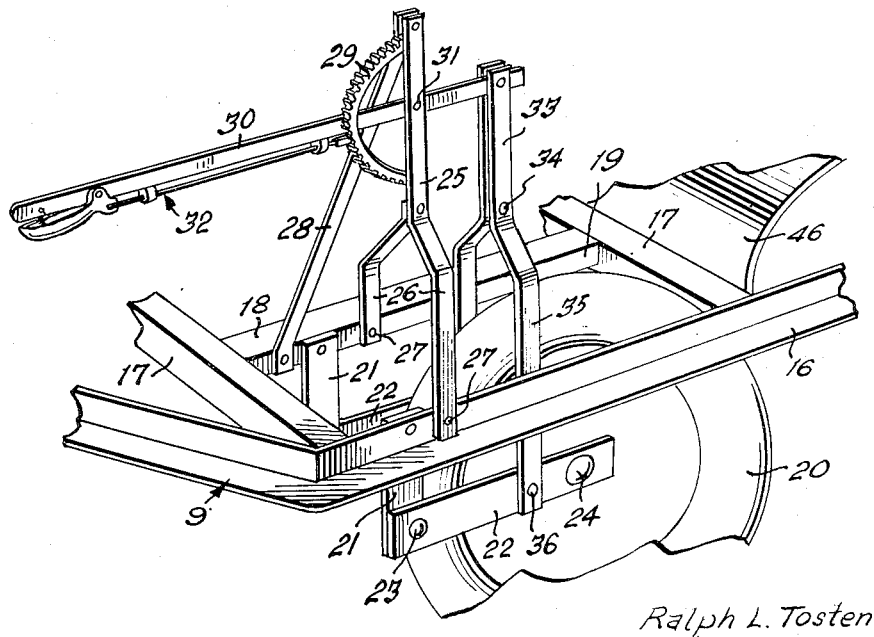
Figure 6 is an enlarged fragmentary perspective view of a portion of one side of the machine.

A gear box 49 is secured on the rear cross frame member 17 intermediate of the sides of the frame 9 and has a shaft housing 50 secured thereto and extending forwardly therefrom and which is supported adjacent its forward end by a bracket 51 on a plate 52 of the frame 9. A shaft 53 is journaled in the housing 50 and has one end thereof extending into the gear box 49 and its other end projecting from the forward end of the shaft housing 50. Said forward end of the shaft 53 is connected by a universal joint 54 to the rear end of a shaft 55, which is formed of telescopic sections and the forward end of which is connected by a second, forward universal joint 56 to the tractor power take-off shaft 15. A second shaft housing 57 is secured at its inner end to the gear box 49 and projects therefrom transversely of the frame 9 and preferably toward its righthand side, looking from rear to front of the machine 8, and has a shaft 58 journaled therein and one end of which extends into the gear box 49. Said adjacently disposed ends of the shafts 53 and 58 are connected by meshing beveled gears 59 which are fixed thereto and rotatably disposed in the gear box 49, as best seen in Figure 7.

Figure 2:
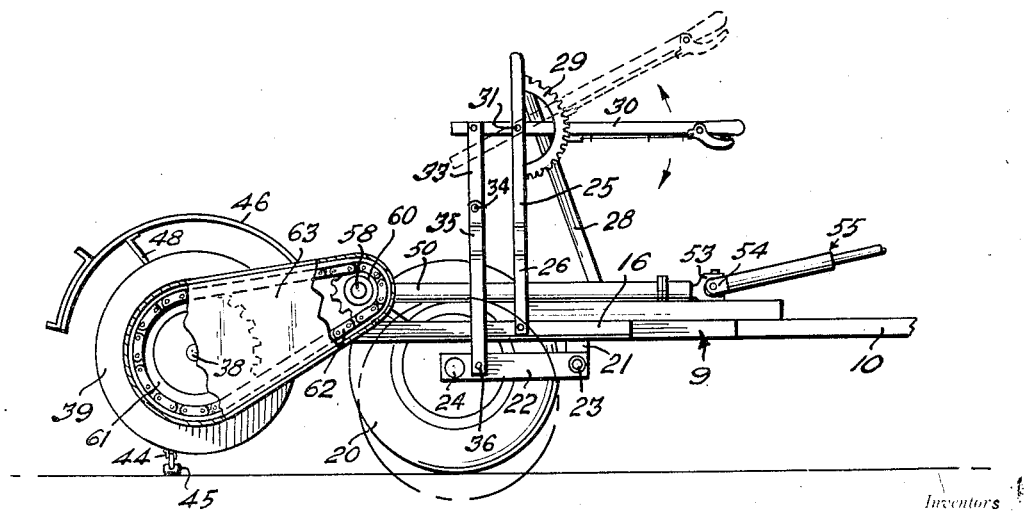
Figure 2 is a side elevational view, partly in longitudinal section, looking toward the opposite side of the machine.
Figure 3:
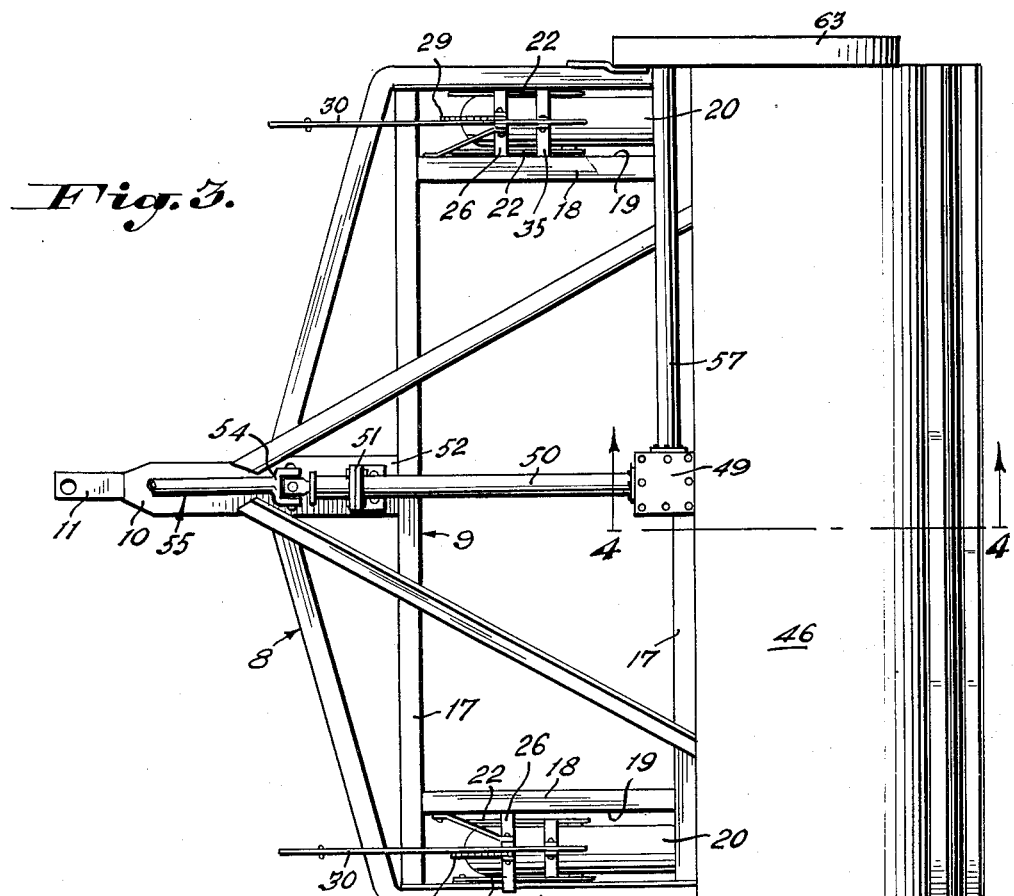
Figure 3 is a top plan view of the machine.

The opposite, outer end of the shaft 58 projects from the outer end of the shaft housing 57, beyond the righthand side of the frame 9 and has a small sprocket wheel 60 fixed thereto. A larger sprocket wheel 61 is fixed to the corresponding end of the shaft 38, which projects outwardly from the same side of the frame 9 and said sprocket wheel 61 is disposed behind and beneath the sprocket wheel 60. An endless chain 62 connects the sprocket wheels 60 and 61, said chain being trained over the sprocket wheels and enclosed by a chain guard 63 which is suitably secured to the frame 9. The sprocket wheel 61 is substantially larger than the sprocket wheel 60 so that the shaft 38 will be driven at a reduced speed. However, it is contemplated that said shaft 38 will be revolved at fifteen hundred to seventeen hundred and fifty R. P. M. The shafts 38 and 58 and the sprocket wheels 60 and 61 may turn in either direction but are preferably driven from the power take-off shaft 15 in a clockwise direction, as illustrated in Figure 2, so that the chains 44 will be revolved with the support 40 in the same direction that the wheels 20 revolve when the machine 8 is drawn by the tractor 14.

From the foregoing, it will be readily apparent that the machine 8 may be pulled by the tractor 14 at any desired speed across a field and with the shaft 38 being revolved at fifteen hundred to seventeen hundred and fifty R. P. M., so that corn, cotton or other stalks in the field will be cut up and finely pulverized by the hammers or impact members 45 which, being revolved at a high rate of speed will strike all pieces of stalks disposed within a path over which the machine 8 is moved for finely cutting up the stalks for exposing any borer worms therein and leaving the pulverized stalks and other growth in a finely divided condition so that it can be readily plowed under for enriching the soil. It will also be readily apparent that any lumpy or hard earth will be broken up by the chains 44 and impact members 45. The depth to which the impact members or hammers 45 will penetrate the earth may be varied by raising and lowering the frame 9 by operation of the levers 30, as previously described, so that the top soil can be effectively broken up and mulched by operation of the machine 8. The chains 44 will be held extended relatively to the support 40 by centrifugal force to cause the hammers or impact members 45 to strike the ground but provide flexible supports for said hammer members so that if a rock or other obstruction is struck thereby no damage will result.

The disks 39 are primarily provided as guards to prevent the chains 44 and hammers 45 from striking the sides of the frame 9 as the shaft 38 commences to revolve or while the shaft is revolving at a very slow speed.

Various modifications and changes are contemplated and may obviously be resorted to, without departing from the spirit or scope of the invention as hereinafter defined by the appended claim.

We claim as our invention:

A cutting and pulverizing machine comprising a machine frame adapted to be coupled to and drawn by a tractor, a pair of laterally spaced ground engaging wheels for supporting said frame, a driven rotary shaft journaled in said frame and transversely thereof, a support mounted on said shaft for rotation therewith and extending substantially from side-to-side of the frame, a plurality of longitudinally extending rows of flexible members, each flexible member having an end secured to said support, a hammer member secured to the other free end of each flexible member and adapted to strike the ground on each revolution of said shaft and support, and a disk fixed to said shaft adjacent each of its ends and inwardly of and adjacent the sides of the frame, said support being secured at its ends to said disks for rotation therewith when the disks are revolved by the shaft, the peripheries of the disks being spaced a greater distance from the axis of the shaft than any part of the support and the outer ends of said chains, when extended, being disposed a greater distance from the axis of the shaft than the peripheries of the disks whereby said disks provide guards which are interposed between the flexible members and hammers and the sides of the frame to prevent the hammers and flexible members from striking the frame sides.

RALPH L. TOSTENRUD.
HENRY F. IRMITER.

REFERENCES CITED

The following references are of record in the file of this patent:

UNITED STATES PATENTS

| Number | Name | Date |
| --- | --- | --- |
| 1,035,056 | Schubert et al. | Aug. 6, 1912 |
| 1,263,965 | Twitchell | Apr. 23, 1918 |
| 1,552,750 | Lain | Sept. 8, 1925 |
| 1,870,932 | Sternemann | Aug. 9, 1932 |
| 2,084,398 | Jongeneel | June 22, 1937 |
| 2,217,809 | Padrick | Oct. 15, 1940 |
| 2,341,486 | Swertfeger | Feb. 8, 1944 |